United States Patent
Mukherjea et al.

(10) Patent No.: US 11,574,467 B2
(45) Date of Patent: Feb. 7, 2023

(54) DOCUMENT AUGMENTED AUTO COMPLETE

(71) Applicant: KYNDRYL, INC., New York, NY (US)

(72) Inventors: Sougata Mukherjea, New Delhi (IN); Saiprasad Kolluri Venkata Sesha, Bengaluru (IN); Seema Nagar, Bangalore (IN); Kuntal Dey, New Delhi (IN)

(73) Assignee: KYNDRYL, INC., New York, NY (US)

( * ) Notice: Subject to any disclaimer, the term of this patent is extended or adjusted under 35 U.S.C. 154(b) by 355 days.

(21) Appl. No.: 16/690,265

(22) Filed: Nov. 21, 2019

(65) Prior Publication Data

US 2021/0158044 A1  May 27, 2021

(51) Int. Cl.
| | | |
|---|---|---|
| *G06V 20/20* | (2022.01) | |
| *G06T 7/13* | (2017.01) | |
| *G06F 3/0482* | (2013.01) | |
| *G06F 40/166* | (2020.01) | |
| *G06F 40/274* | (2020.01) | |
| *G06V 30/40* | (2022.01) | |
| *G06F 40/30* | (2020.01) | |
| *G06F 40/211* | (2020.01) | |
| *G06F 40/284* | (2020.01) | |

(52) U.S. Cl.
CPC ............ *G06V 20/20* (2022.01); *G06F 3/0482* (2013.01); *G06F 40/166* (2020.01); *G06F 40/274* (2020.01); *G06T 7/13* (2017.01); *G06V 30/40* (2022.01); *G06F 40/211* (2020.01); *G06F 40/284* (2020.01); *G06F 40/30* (2020.01); *G06T 2207/30176* (2013.01)

(58) Field of Classification Search
CPC .... G06F 40/166; G06F 40/274; G06F 3/0482; G06F 30/40; G06K 9/00671; G06K 9/00442; G06T 7/13; G06V 20/20; G06V 30/40
See application file for complete search history.

(56) References Cited

U.S. PATENT DOCUMENTS

| | | | |
|---|---|---|---|
| 8,046,343 B2 | 10/2011 | Mukundan et al. | |
| 8,489,413 B1 * | 7/2013 | Larson | G16H 10/60 705/2 |
| 9,659,109 B2 | 5/2017 | Hiwale et al. | |
| 10,043,069 B1 * | 8/2018 | Liu | G06K 9/2072 |
| 10,324,938 B2 | 6/2019 | Hu et al. | |

(Continued)

FOREIGN PATENT DOCUMENTS

WO     2017189341 A1    11/2017

*Primary Examiner* — Thu V Huynh
(74) *Attorney, Agent, or Firm* — Tutunjian & Bitetto, P.C.; John Kennel

(57) ABSTRACT

A field-of-view of a scene is scanned by an augmented reality device. The scene includes one or more objects including a first computing device. A portion of an electronic document is detected based on the scanned field-of-view. The portion of the electronic document is rendered on a display of the first computing device. A content element of the electronic document that is rendered on the display is captured. A second computing device determines an incomplete portion of the content element. A suggestion to complete the incomplete portion is provided by the augmented reality device.

14 Claims, 3 Drawing Sheets

(56) References Cited

U.S. PATENT DOCUMENTS

| | | | |
|---|---|---|---|
| 10,699,145 B1* | 6/2020 | Bertrand | G06K 9/00483 |
| 2002/0069223 A1* | 6/2002 | Goodisman | G06F 16/958 |
| | | | 715/201 |
| 2013/0033522 A1 | 2/2013 | Calman et al. | |
| 2014/0019905 A1* | 1/2014 | Kim | G06F 3/04883 |
| | | | 715/780 |
| 2014/0188756 A1* | 7/2014 | Ponnavaikko | G06K 9/00449 |
| | | | 705/342 |
| 2014/0280016 A1 | 9/2014 | Williams et al. | |
| 2015/0067491 A1 | 3/2015 | Rajamony et al. | |
| 2015/0205828 A1 | 7/2015 | Manciero et al. | |
| 2016/0092598 A1 | 3/2016 | Mishra | |
| 2016/0364912 A1 | 12/2016 | Cho et al. | |
| 2017/0032136 A1 | 2/2017 | Gangadharappa et al. | |
| 2017/0103124 A1* | 4/2017 | Hassan | G06K 9/3258 |
| 2017/0116784 A1 | 4/2017 | Hintermeister et al. | |
| 2017/0235791 A1* | 8/2017 | Lakkur | G06F 9/451 |
| | | | 715/240 |
| 2017/0277737 A1 | 9/2017 | Singh et al. | |
| 2017/0277770 A1 | 9/2017 | Singh et al. | |
| 2018/0314343 A1 | 11/2018 | Montaldi et al. | |
| 2019/0025587 A1 | 1/2019 | Osterhout et al. | |
| 2019/0199656 A1* | 6/2019 | Foerster | G06N 20/00 |
| 2021/0168279 A1* | 6/2021 | Gao | G06V 10/242 |

\* cited by examiner

DOCUMENT AUGMENTED AUTO COMPLETE

BACKGROUND

The present disclosure relates to augmented reality, and more specifically, to auto complete suggestions and auto-completion with augmented reality.

Augmented reality may be used to perform image and edge analysis to identify and call-out elements within an augmented view of a real-world scene. Augmented reality may also be used to provide extraneous information about real-world elements of the scene, such as identified places. Augmented reality is, however, detached and disconnected from other computing systems and may be unable to provide meaningful interaction models with other computing devices.

SUMMARY

A method, system, and computer program product for document manipulation are discussed according to embodiments of the present disclosure. A field-of-view of a scene is scanned by an augmented reality device. The scene includes one or more objects including a first computing device. A portion of an electronic document is detected based on the scanned field-of-view. The portion of the electronic document is rendered on a display of the first computing device. A content element of the electronic document that is rendered on the display is captured. A second computing device determines an incomplete portion of the content element. A suggestion to complete the incomplete portion is provided by the augmented reality device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
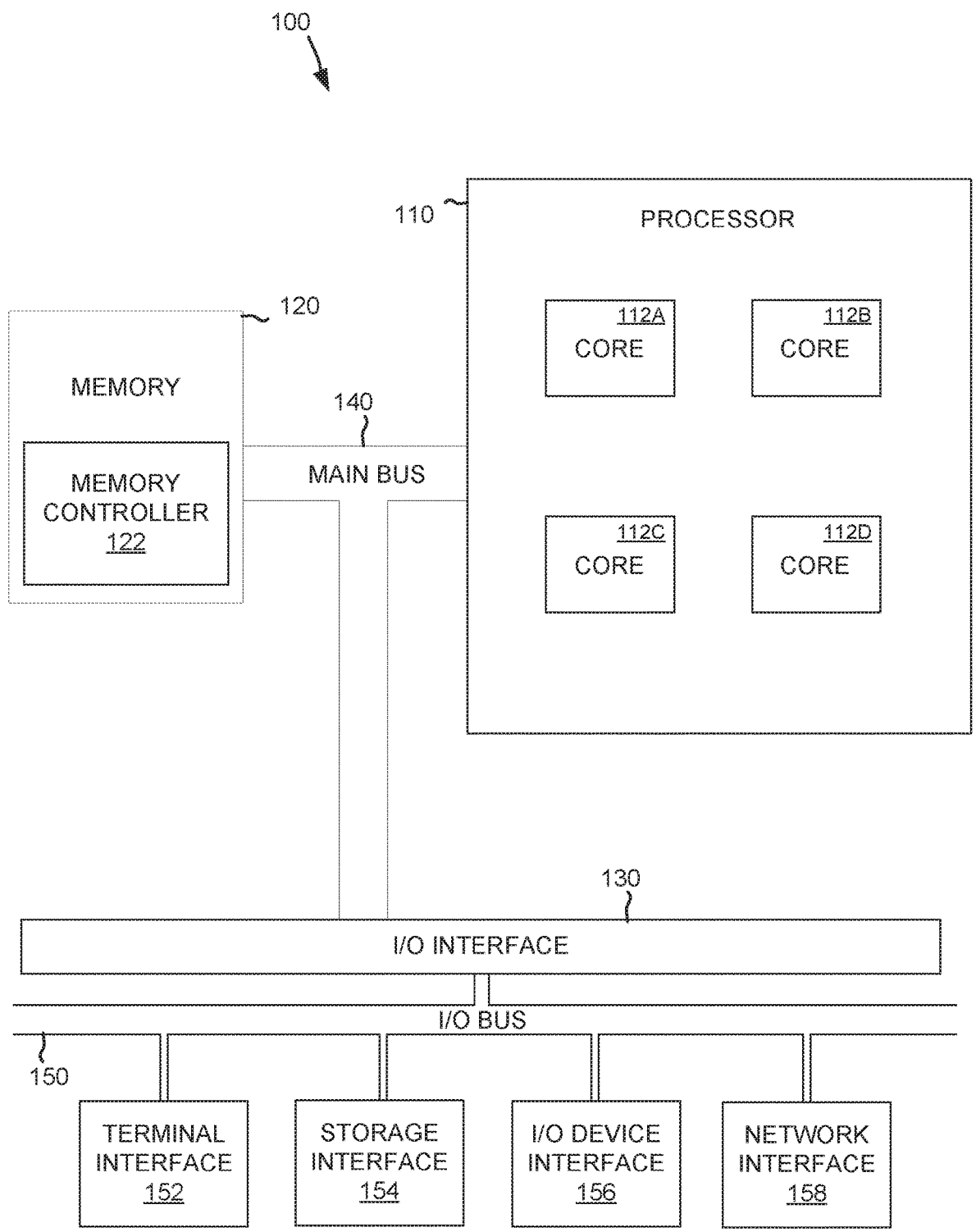
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality, more particular aspects relate to document auto complete suggestions and autocompletion of a computer system from an augmented reality device. While the present disclosure is not necessarily limited to such applications, various aspects of the disclosure may be appreciated through a discussion of various examples using this context.

Augmented reality devices (e.g., headsets, glasses, contacts) may be used to provide additional information to a field-of-view (alternatively, view) of a real-world scene. Such augmented view devices may become more popular as price decreases and technology allows for augmented reality devices to be used and worn by more people and in and during day-to-day activities.

Augmented reality devices may operate by capturing an image of a view of a real-world scene. An augmented reality device may include computing resources for performing operations on a captured image. The captured image may be processed to detect objects and capture information regarding the elements. The objects may be real-life elements, such as users and animals. The objects within the captured image may be inanimate objects such as furniture, walls, and doorways. In some embodiments, the elements within the captured image may be signs or other textual elements constructed for providing information to human beings, for example street signs.

Augmented reality devices may, however, struggle to capture, process, and render an augmented view of a scene that includes computing devices. For example, laptop computers or smartphones may be information dense and may contain numerous lines of text and images. The wearable technology of augmented reality devices is improving, but providing adequate processing power for augmented devices may result in wearable computing systems that are large, bulky, and in many cases hot and noisy. Augmented reality could be beneficial to provide certain suggestions regarding documents, computer rendered objects, and text from computing systems, but the processing power to do so makes augmented reality devices usage unwieldy.

In some cases, computing devices may include specific applications with auto-complete functionality. These application-specific auto-complete functions may only be partially functional, as they provide an application-specific dictionary with limited words. Application-specific auto-complete software may only check and provide suggestions while using a specific application. Further, certain mixed-media applications, such as software system architecture diagram creation or other targeted domain-specific applications, may be unable to provide auto-complete functionality of any kind. Mixed-media applications may include text, drawings, renderings, photographs, and other elements. The mixed-media application may not have any auto-complete functionality.

In some cases, a computing device may have a system-level auto-complete software installed. There may be drawbacks to this approach however. A system-level auto-complete software may lead to system instability and insecurity. For example, a system-level auto-complete software may have access to low level kernel or other portions of a computing system to be able to read keystrokes of a user. A system-level auto-complete software may be able to read information input by a user such as passwords. Further, a system-level auto-complete software may need vast information and databases stored on a computer system to provide adequate auto-complete functionality. This may lead to security complications that leak user data. For example, a user may want to use a shared computer, and the shared computer may have limited or no system-level auto-complete software. If a system-level auto-complete software was installed on the public computer, information of the user may be shared or stored for auto-complete purposes but may also be available to other users of the computer system.

To overcome these disadvantages, disclosed is a an augmented-reality auto-complete engine (ARACE). The ARACE may include a method, system, and computer program product for complex document segments within well-defined domains. The ARACE may operate by scanning a view of a real-world environment. The ARACE may transfer the view to a secondary computing device for processing and identification of textual documents found on computing devices within the view. The ARACE may operate by intelligently transferring the user's selection of auto-complete suggestion units from an augmented-reality device into the physical-world device.

The ARACE may provide auto-complete to applications that previously did not have auto-correct features (e.g., software architecture programs, technical document applications, image editors). The ARACE may provide auto-complete to applications without modifying the underlying code or software of computing devices or included within the application. The ARACE may offload auto-complete to a secondary computer that may provide consistency in suggestions independent of the computing device platform. For example, an ARACE may provide consistent suggestions to a user's smartphone and desktop computer. The ARACE may provide increased privacy to users. For example, a user may have a personal dictionary that includes names, contacts, and addresses on a computer coupled to the ARACE. The user may use a friend's computer that does not have any stored information regarding the user. Through the personal dictionary communicatively coupled to the ARACE, an augmented suggestion that includes relevant names, contacts, and addresses, may be rendered overlaid to the augmented view of the user. The user may then select from the augmented view of the ARACE the relevant personal information, and responsively the ARACE may send the selected personal information to the friend's computer without storing that contact information on the friend's computer.

The ARACE may provide certain users with auto-complete functionality with increased security and customizability. For example, a user of an ARACE may be an administrative user of a public library. The public library may have a plurality of desktop computers for use by patrons of the library. The desktop computers may have limited information stored on datastores of the computers, and the desktop computers may, consequently, provide limited or no auto-complete functionality. The desktop computer may have a limited datastore to spell simple words like "cat" or "tree." The administrative user of the public library may be able to access a more powerful auto-complete engine seamlessly from an augmented reality device using ARACE. The administrative user may open a terminal on a first computer of the plurality of desktop computers and may begin typing application-specific commands. The ARACE may capture the view of the real-world including a screen of the first computer. The ARACE may detect a portion of screen that displays the terminal. The ARACE may render an augmented view including suggestions of high-level syntax and commands for input in the terminal. In response to a selection by the administrative user, the ARACE may provide the selected suggestions to the first computer.

The ARACE may leverage image processing to identify certain elements within a captured view. The ARACE may leverage an image processor (not depicted). The image processor may be a collection of hardware and software, such as an application specific integrated circuit.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, HOG features, or other machine learning and/or deep learning object detection algorithms. The output of the object detection algorithm may include one or more identities of one or more respective objects with corresponding match certainties. For example, a real-world environment including an electronic device with a screen may be analyzed. Using a relevant object detection algorithm, the screen and displayed content may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model. For example, if a user captures an image of their vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., two eyes), colors of object, and/or other attributes of objects. In some embodiments, the output may generate a list including the identity and/or characteristics of objects (e.g., cotton shirt, metal glasses, etc.). In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person textual elements rendered within windows of a graphical user interface), relationships with other objects (e.g., content of a first application may be bordered by a first application window, content of a second application may be bordered by a second application window, application content of a portable computer may be bordered by a bezel of a screen of the portable computer), or objects belonging to the same class (e.g., two bolt-heads are metric sized).

The ARACE may operate by performing text processing on one or more elements within a captured image. The ARACE may provide suggestions based upon the performance of textual operations to determine the meaning of applications detected within screens of a viewpoint of an augmented device worn by a user.

In some embodiments, a natural language processing system may include various components (not depicted) operated through hardware, software, or in some combination. For example, a natural language processor, one or more data sources, a search application, and a report analyzer. The natural language processor may be a computer module that analyzes the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from a captured document of a view of a real-world scene. Various components (not depicted) of the natural language processor may include, but are not limited to, a tokenizer, a part-of-speech (POS) tagger, a semantic relationship identifier, and a syntactic relationship identifier.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., a word may be suggested in an augmented view of a second computing device with a second screen from a paragraph and related context captured from an earlier augmented view of a first computing device with a first screen). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a view of a real-world scene from an augmented reality device at the natural language processing system, the natural language processor may output parsed text elements from the scene as data structures. In some embodiments, a parsed text element may be represented in the form of a parse tree or other graph structure. To generate the parsed text element, the natural language processor may trigger computer modules including the tokenizer, the part-of-speech (POS) tagger, the semantic relationship identifier, and the syntactic relationship identifier.

In some embodiments, the ARACE may accept user inputs on the basis of the user's field-of-view on an augmented reality device, to determine a partially completed text-and-image based sub-document at the input, such as a solution system architecture or some other complex structure within a document. In some embodiments, the ARACE may deliver auto-complete suggestions to the augmented reality device of the user, in form of user-gesture-enabled content, that the user can preview from, using overlaying techniques that provide a view of the on-screen partially completed sub-document superimposed with the different auto-completion solutions offered. In some embodiments, the ARACE may leverage an augmented reality device capable of accepting gestures. A user may make gestures for browsing of auto-complete solutions provided by the augmented reality device. Using the augmented reality device, the user can "flip" the auto-complete from one suggestion to another, and optionally tag the solutions on the augmented reality device via making specific gestures, sounds etc. The ability to browse may enable a user to gather an intuition on how each of the solutions would look like in terms of image and text as the augmented reality device may composite the selection into the view of the document through the augmented reality device, without actually making any change to the source image/text displayed solely by the electronic device. In some embodiments, the augmented reality device may cancel out of providing suggestions. For example, if a user discards all the suggestions, the ARACE may responsively repeat scanning of the augmented view and generating suggestions after a finite amount of time/progress. The progress may be based on a threshold number of pages, or another threshold (e.g., number of minutes, additional set number of paragraphs added by the user).

FIG. 1 depicts the representative major components of an example computer system 100 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2:
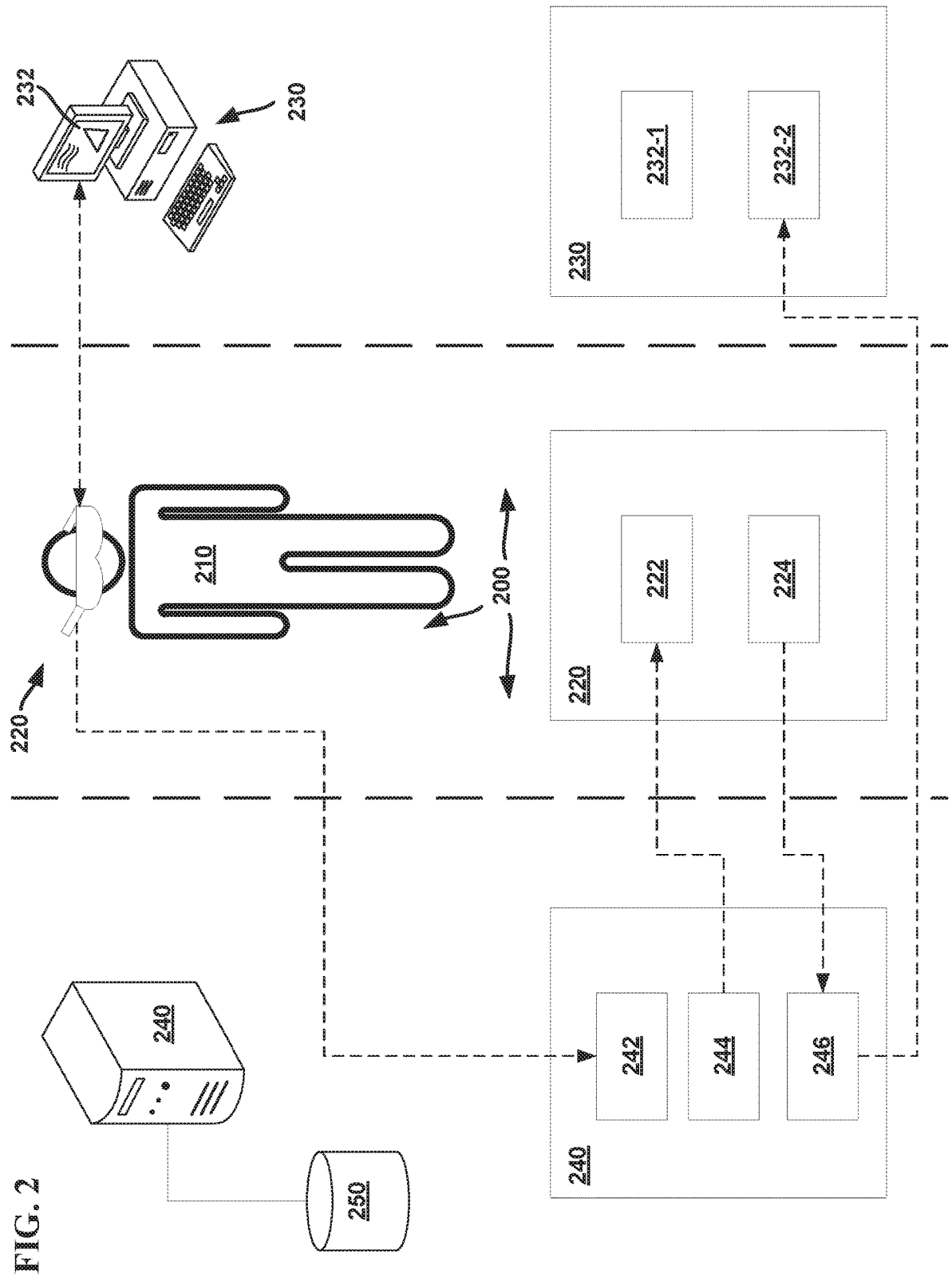
FIG. 2 depicts an example system for providing auto-complete of a first computer from an augmented reality device utilizing a second computing device, consistent with some embodiments of the disclosure.

FIG. 2 depicts an example system 200 for providing auto-complete of a first computer from an augmented reality device utilizing a second computing device, consistent with some embodiments of the disclosure. System 200 may leverage an ARACE to provide auto-complete suggestions integrated into a field-of-view of a user 210. System 200 may include the following components: an augmented reality device 220 for capturing a view of various scenes, and providing an augmented view to the user 210; a first computing device 230 for performing various computing tasks; a second computing system 240 for performing text analysis and image analysis; and a datastore 250 for storing various dictionaries and knowledge bases. The datastore 250 may be a database or other data structure for storing one or more dictionaries, textual entries, syntactic meanings, and other templates. The datastore 250 may include various subject-matter specific dictionaries (e.g., foreign languages, computer architecture objects, computer software syntax conventions).

The augmented reality device 220 may be a wearable device configured with a camera for scanning scenes of a real-world environment. The augmented reality device 220 may detect and capture various objects in the real-world environment, such as first computing device 230. The first computing device 230 may include a display 232 (e.g., a liquid crystal display computer monitor). The augmented reality device 220 may capture content rendered on the display 232 by the first computing device 230. The display 232 at a first time 232-1 may show electronic documents with incomplete text and/or figures. The augmented reality device 220 may include one or more buttons, triggers, or touch sensitive surfaces (not depicted) for receiving indications or other various input from user 210.

The augmented reality device 220 may be communicatively coupled to the second computing device 240 (e.g., through a network connection). The second computing device 240 may be a server configured to provide various insights to captured scenes of real-world environments. FIG. 1 depicts an example computer system that may operate as second computing device 240 in some embodiments.

Second computing device 240 may include a text and image analyzer 242 ("analyzer"). The analyzer 242 may be a plurality of general-purpose or application specific hardware circuits. The analyzer 242 may be one or more software routines, kernel extensions, and drivers. The analyzer 242 may be a combination of hardware and software configured to operate the ARACE for identifying incomplete portions of content. The ARACE may operate on a view of the scene captured from augmented reality device 220. The ARACE may leverage the analyzer 242 to identify through image analysis and natural language processing, one or more incomplete portions of documents rendered at the first time 232-1. The analyzer 242 may interface with the datastore 250 to identify various portions of the documents displayed on display 232.

The ARACE may create a map of an entire document from continuously received images. For example, the analyzer 242 may identify text entities, meaning of text, and objects within the image that have identified from object detection analysis (e.g., computer vision techniques). The analyzer 242 may formulate context of an entire document by using a combination of currently received images and previous received images from the augmented reality device 220 regarding the previously tracked display 232. The ARACE may operate to stitch the current and previous images as a sequence, to recreate a map of the entire document.

The second computing device 240 may also include an auto-complete candidate finder 244 ("finder"). The finder 244 may be a plurality of general-purpose or application specific hardware circuits. The finder 244 may be one or more software routines, kernel extensions, and drivers. The finder 244 may be a combination of hardware and software configured to operate ARACE for generating suggestions. The ARACE may leverage the finder 244 to generate one or more suggestions. The finder 244 may operate on the current view an image of the augmented reality device 210. In some embodiments, the finder 244 may operate upon an entirely stitched together document from multiple images. The suggestions may be provided to the augmented reality device 220.

The ARACE may leverage image analysis and textual analysis to provide multiple suggestions for completing documents (with potentially multiple sections) or sub-documents. The ARACE may provide suggestions, by proposing additional architectural components (or, in general, additional text/image based components), via matching templates and instances present in the local knowledge base of datastore 250. The augmented reality device 220 may render the suggestions at 222. The suggestion 222 may include a rendered notification in form of a pop-up or flash or some other visual or audio signal, on the augmented reality device 210. The notification may indicate that one or more suggestions for auto-complete is/are available. For example, a subtlety pulsing notification within the view through augmented reality device 220 may state "auto-complete suggestion available."

The rendered suggestions 222 may be those received from the second computing device 240 for the user. The augmented reality device 220 may render the suggestions at 222 by compositing the suggestions in the view of the user. The augmented reality device 220 may implement an augmented-reality based overlay technique for a user 210 to appropriately select a suggestion (or, different sub-components within a suggestion) from a multitude of suggestions provided by the auto-complete system 200 shown by the augmented reality device 220.

For example, in order for the user to understand that the suggestions rendered suggestions are related to the incomplete portions of the content of applications rendered display 232 at first time 232-1, the compositing may include identifying edges of the display 232, such as the bezel. The compositing may include identifying edges of various documents displayed as part of content rendered by the first computing device 230 and put on the display 232 (e.g., window borders, paragraph spacing, virtual page breaks rendered by a document program, content figures with various continuous lines). The compositing may also include generating a view that is aligned with the identified edges. The compositing may include continuously generating the view such that as the user moves their eyes or head, the alignment of the suggestions stay in-line with the incomplete portion. The compositing may be performed by the augmented reality device 220. In some embodiments, the compositing may be performed by the second computing device 240.

The augmented reality device 220 may receive a selection indication (alternatively, selection) based on the suggestions at 224. In some embodiments, the augmented reality device 220 may receive a selection at 224 by a gestural interface. The selections received at 224 may be to select between different suggestions provided by the second computer system 240. For example, a paragraph displayed at a time 232-1 on display 232 may include the following sentence fragment: "The marketing department tried to make a budget for a new". The augmented display generated at 222 may include a list of suggestions including the following terms: "campaign," "commercial," "television spot," "print advertisement placement." The augmented display may include rendering the term "campaign" with differing text such as a bold, italics, or highlighted surrounding whitespace to emphasize to the user that the first suggestion is currently selected. Upon receiving a selection 224 to alter the selection from the first suggestion to one of the other suggestions, the augmented device 220 may render an augmented view at 222 with another term, e.g., "commercial," composited into the view of the user.

The selection received at 224 by the augmented reality device 220 may be a cancelation indication (alternatively, cancelation) of the suggestion. The augmented reality device 220 may render a new augmented view that no longer provides the selections in response to the cancelation. The augmented reality device 220 may send the cancelation indication received at 224 to the second computer system 240.

The selection received at 224 by the augmented reality device 220 may be a selection indication (alternatively, selection) to indication the currently presented suggestion is approved by the user 210. The selection received at 224 may be sent to the second computer system 240. The second computer system 240 may send the completed portion at 246 to the first computer system 230. The completed portion may include the incomplete portion and the selected suggestion. For example, a complete sentence may be provided by the second computer system 240 at 246. In another example, a system architecture diagram may be provided with an updated graphical element at 246. The first computer system 230 may operate with a plugin or other local software component for receipt of the suggestions from the second computer system 240. In some embodiments, the second computer system 240 may generate a copy of the document, establish a network connection with the first computer system 230 and transfer the copy of the document at 246. The copy of the document may include the incomplete portion and the suggestions in a format that is complete (e.g., a complete portion incorporating the selected suggestion of user 210). The first computer system 230 may render an updated user interface on the display 232 at a second time 232-2 after the first time 232-1. The updated user interface at time 232-2 may include the completed portion including the suggestion selected by the user 210.

Figure 3:
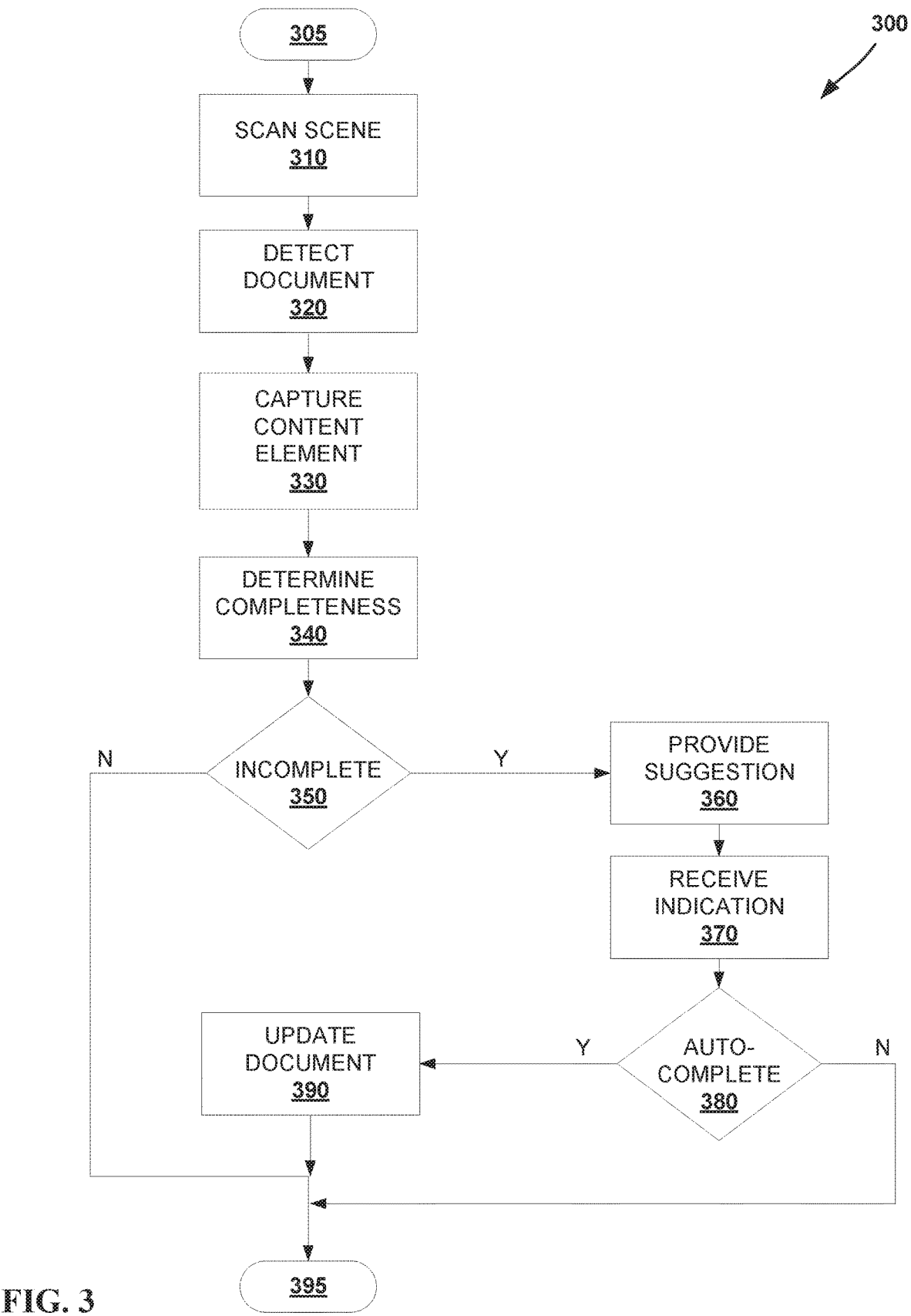
FIG. 3 depicts a method for performing document manipulation with an augmented-reality auto-complete engine (ARACE), consistent with some embodiments of the disclosure.

FIG. 3 depicts a method 300 for performing document manipulation with the ARACE, consistent with some embodiments of the disclosure. Method 300 may be performed by an augmented reality device (e.g., such as described in FIG. 2). Method 300 may be performed by a server or other computing device. FIG. 1 depicts an example computing device capable of performing operations of method 300. Method 300 may be performed continuously. Method 300 may be performed periodically (e.g., every 16 milliseconds, every minute, every 7 minutes). Certain operations of method 300 may be performed by a combination of an augmented reality device and a separate computing device.

Method 300 begins at 305, as a scene is scanned at 310. The scene may be scanned directly by an augmented reality device (e.g., through a field-of-view captured by a camera built into the augmented reality device). In some embodiments, the scene may be scanned by a combination of the augmented reality device and a second computing device. For example, an augmented reality device may continuously scan a scene and send the image captured to a server for processing at 310.

At 320 an electronic document is detected. The electronic document may be detected by the performance of image processing. The image processing may detect features of the real-world environment of the scene. For example, the image processing may detect edges of a display of a smartphone, desktop PC or other first computing device. The image processing may be based upon optical character recognition (e.g., detecting words, letters, or sentences).

At 330 one or more content elements may be captured from the electronic document. The content elements captured may be based on text and image recognition elements. For example, at 330 an image processor of a second computing device may perform neural networking to identify features of the detected electronic document.

At 340 the captured content elements may be processed to determine if the content elements are complete. The determination may be performed by a second computing device. The determination may be based on natural language processing to determine sentence fragments. The determination may be made based on image recognition. For example, by comparing partially complete flowchart documents and complete flowchart documents. The documents may be stored in a datastore accessible by the second computing device. The datastore may not be accessible by other computing devices such as a first computing device that has a display (that was scanned at 310).

If it is determined that a captured content element is complete (350:N) then method 300 ends at 395. If it is determined that a captured content element is incomplete (350:Y) then one or more suggestions are provided at 360. The one or more suggestions may be generated by the second computing device and provided to the augmented reality device. The one or more suggestions may be generated based on textual analysis techniques such as natural language processing. The augmented reality device may provide the suggestions through an augmented view to the user. For example, the augmented reality device may identify edges of a display or regions of text or images of a display of the first computing device. The augmented reality device may generate an augmented view that is aligned with the display. The augmented reality device may generate an augmented view with the suggestions for autocomplete rendered adjacent to the incomplete portion (e.g., within a few pixels of the incomplete portion, within 15 points of a document region having the incomplete portion). The one or more suggestions may also be presented with affordances for a user of the augmented reality device to select from them. For example, a vertical list of suggestions may be generated in an augmented view with one of the suggestions visually differentiated from the others.

At 370 an indication may be received by the augmented reality device. If the indication is not an autocomplete indication (380:N) then method 300 ends at 395. If the indication is an autocomplete indication (380:Y) an updated document may be provided to the first computing device at 390. Providing the updated document may include providing to the second computing device the incomplete portion. Providing the updated document may include providing to the second computing device a copy of the document that includes the complete portion. Providing the update may include establishing a network connection between the augmented reality device and the first computing device. Providing the update may include establishing a network connection between the second computing device and the first computing device. The update may be provided through the network connection. For example, the second computing device or the augmented reality device may transfer the completed portion of the content element to the first computing device. After providing an updated document at 390, method 300 ends at 395.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of document manipulation, the method comprising:
   receiving, from an augmented reality device, a scanned field-of-view of a scene, wherein the scene includes one or more objects including a first computing device, and the scanned field-of-view includes a display monitor of the first computing device;
   detecting, in the scanned field-of-view, a portion of an electronic document being rendered on the display monitor and one or more edges of the display monitor;
   capturing a content element of the electronic document rendered on the display monitor;
   determining, by a second computing device, that the content element rendered on the display monitor incomplete, wherein the incomplete content element is an incomplete sentence, an incomplete figure, or both the incomplete sentence and the incomplete figure, wherein the incomplete content element rendered on the display monitor does not include a missing portion of the content element that is not rendered on the display monitor, and wherein the content element consists of the incomplete element and the missing portion; and
   providing, to the augmented reality device, a suggestion to identify the missing portion to complete the incomplete content element for rendering the completed content element on the augmented reality device, the suggestion being displayed adjacent to the one or more edges of the display monitor.

2. The method of claim 1, wherein:
   the first computing device includes a first data store,
   the second computing device includes a second data store,
   the second data store contains more information than the first data store, and
   the first computing device does not have access to the second data store.

3. The method of claim 1, wherein the determining further comprises:
   performing an image analysis operation on the electronic document to determine the missing portion of the content element.

4. The method of claim 1, wherein the scanned field-of-view that includes the display monitor includes a bezel of the display monitor;
and wherein the providing the suggestion further comprises:
generating, for display on the augmented reality device, an augmented view that includes the suggestion at the one or more edges at the bezel of the display monitor, wherein the augmented view is aligned with the one or more edges of the display monitor, and wherein the suggestion is located adjacent to the incomplete content element.

5. The method of claim 1, the method further comprising:
receiving, by the augmented reality device and in response to the suggestion to complete the incomplete content element, an autocomplete indication regarding the suggestion.

6. The method of claim 5, the method further comprising:
establishing a network connection between the augmented reality device and the first computing device; and
providing, through the established network connection, the missing portion of the content element of the electronic document.

7. A system, said system comprising: one or more memories containing one or more instructions; and one or more processors communicatively coupled to the one or more memories, said one or more processors, in response to reading the one or more instructions, configured to:
receive, from an augmented reality device, a scanned field-of-view of a scene, wherein the scene includes one or more objects including a first computing device, and the scanned field-of-view includes a display monitor of the first computing device;
detect, based on the scanned field-of-view, a portion of an electronic document being rendered on the display monitor and one or more edges of the display monitor;
capture a content element of the electronic document rendered on the display monitor;
determine, by a second computing device, that the content element rendered on the display monitor is incomplete, wherein the incomplete content element is an incomplete sentence, an incomplete figure, or both the incomplete sentence and the incomplete figure, wherein the incomplete content element rendered on the display monitor does not include a missing portion of the content element that is not rendered on the display monitor, and wherein the content element consists of the incomplete element and the missing portion; and
provide, to the augmented reality device, a suggestion to identify the missing portion to complete the incomplete content element for rendering the completed content element on the augmented reality device, the suggestion being displayed adjacent to the one or more edges of the display monitor.

8. The system of claim 7, wherein:
the first computing device includes a first data store,
the second computing device includes a second data store,
the second data store contains more information than the first data store, and
the first computing device does not have access to the second data store.

9. The system of claim 7, wherein the processor is further configured to:
perform an image analysis operation on the electronic document to determine the missing portion of the content element.

10. The system of claim 7, wherein the scanned field-of-view that includes the display monitor includes a bezel of the display monitor;
and wherein said provide the suggestion further comprises:
generate, for display on the augmented reality device, an augmented view that includes the suggestion at the one or more edges at the bezel of the display monitor, wherein the augmented view is aligned with the one or more edges of the display monitor, and wherein the suggestion is located adjacent to the incomplete content element.

11. A computer program product, said computer program product comprising a computer readable storage medium having one or more program instructions embodied therewith, said program instructions configured to:
receive, from an augmented reality device, a scanned field-of-view of a scene, wherein the scene includes one or more objects including a first computing device, and the scanned field-of-view includes a display monitor of the first computing device;
detect, based on the scanned field-of-view, a portion of an electronic document being rendered on the display monitor and one or more edges of the display monitor;
capture a content element of the electronic document rendered on the display monitor;
determine, by a second computing device, that the content element rendered on the display monitor is incomplete, wherein the incomplete content element is an incomplete sentence, an incomplete figure, or both the incomplete sentence and the incomplete figure, wherein the incomplete content element rendered on the display monitor does not include a missing portion of the content element that is not rendered on the display monitor, and wherein the content element consists of the incomplete element and the missing portion; and
provide, by the augmented reality device, a suggestion to complete the incomplete content element for rendering the completed content element on the augmented reality device, the suggestion being displayed adjacent to the one or more edges of the display monitor.

12. The computer program product of claim 11, wherein the program instructions are further configured to:
receive, by the augmented reality device and in response to the suggestion to complete the incomplete content element, an autocomplete indication regarding the suggestion.

13. The computer program product of claim 11, wherein the program instructions are further configured to:
establish a network connection between the augmented reality device and the first computing device; and
provide, through the established network connection, the missing portion of the content element of the electronic document.

14. The computer program product of claim 11, wherein the scanned field-of-view that includes the display monitor includes a bezel of the display monitor; and wherein said provide the suggestion further comprises:
generate, for display on the augmented reality device, an augmented view that includes the suggestion at the one or more edges at the bezel of the display monitor, wherein the augmented view is aligned with the one or more edges of the display, and wherein the suggestion is located adjacent to the incomplete content element.

* * * * *